Feb. 7, 1939.            B. DUNGLINSON            2,146,371
                            FLOW METER
                         Filed Oct. 10, 1935
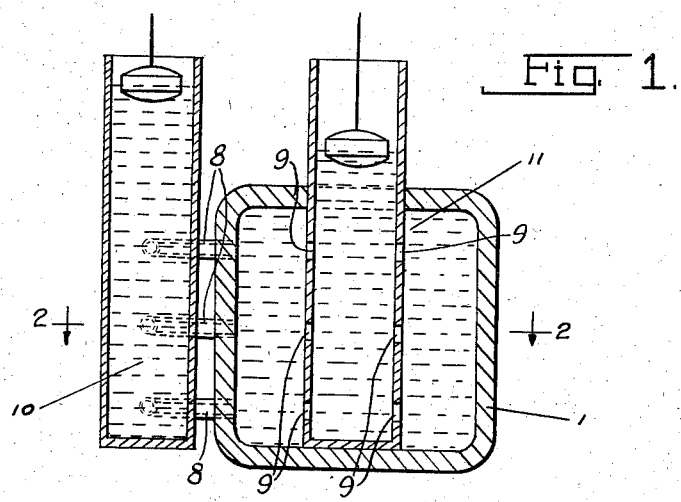
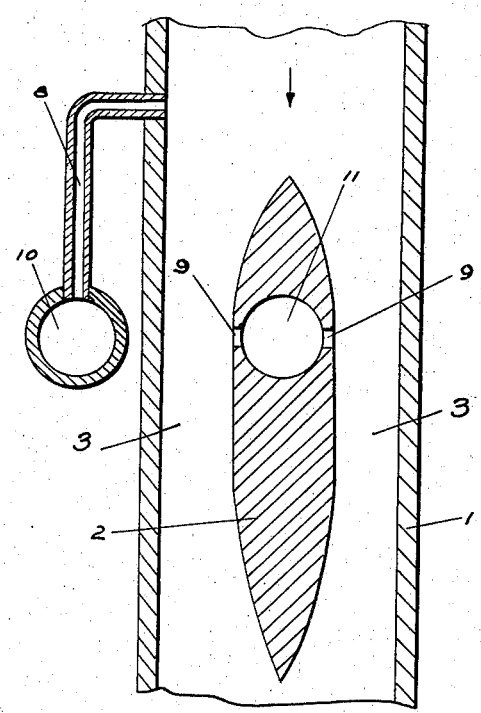
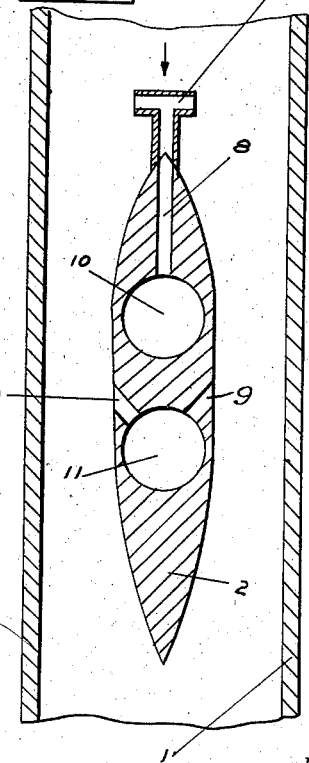
INVENTOR.
BURTON DUNGLINSON
BY McConkey & Booth
ATTORNEYS.

Patented Feb. 7, 1939

2,146,371

UNITED STATES PATENT OFFICE 2,146,371

FLOWMETER

Burton Dunglinson, London, England, assignor to Republic Flow Meters Company, Chicago, Ill., a corporation of Illinois Application October 10, 1935, Serial No. 44,387 In Great Britain January 11, 1935

5 Claims. (Cl. 73—213)

This invention relates to flowmeters and more particularly to flowmeters including constricted conduits the flow through which is to be measured.

In flowmeters including conduits constricted by the use of an orifice plate or Venturi passage considerable difficulty has been encountered due to silting or deposition of solid or heavy material carried by the fluid and the use of such devices necessitated the use of specially shaped pipe or conduit sections. Accordingly, it is one of the objects of the invention to provide a flowmeter including a constricted conduit in which these difficulties are overcome.

Another object is to provide a constricted conduit in which silting is eliminated and in which no special pipe or conduit sections are required.

According to one feature of the invention the constriction is produced by introducing into the flow passage a shaped element which is fixed in position therein and around which the liquid can flow so that the constriction is formed between the outer surface of said element and the inner surface of the conduit.

According to another feature of the invention the constriction is formed without substantially changing the inner contour of the conduit and by introducing into the flow passage of the conduit a shaped element around which the liquid can flow so that a constricted passage or passages is or are formed between the outer surface of the said element and the inner surface of the conduit.

A further feature of the invention relates to constructing in the element forming the constriction a float well or wells for measurnig the pressure head at a point or various points in the conduit.

Other objects, advantages and novel particular constructions will be apparent from the following detailed description in connection with the accompanying drawing, in which:

Figure 1 is a vertical sectional view of one form of the invention;

Figure 2 is a horizontal section taken on the line 2—2 of Figure 1; and

Figure 3 is a horizontal sectional view of another embodiment of the invention.

In the embodiment illustrated in Figures 1 and 2, a conduit 1 which is of square or substantially square cross section and through which is to flow the liquid whose flow charactetristics are to be measured, is formed with a partial obstruction consisting of a shaped element 2 which is disposed within the interior of the conduit so that it extends completely thereacross from the top to the bottom of the conduit and forms a constricted passage 3 at each side thereof. Element 2 is secured at its ends to the conduit. The flow passage constricting element 2 is preferably formed so that its side walls are substantially vertical and so that in horizontal section it is of streamlined contour or comprises inclined or tapering end portions merging into an intermediate portion which, over a part of its length, is substantially parallel to the axis of the conduit.

Suitable means are provided for measuring the pressure difference created by the flow passage constricting element and include a pressure tapping 8 disposed at the upstream side and just in front of the element 2 and another pressure tapping 9 at or near the narrowest part of the constricted flow passage. Such tappings may be connected with float wells as indicated at 10 and 11 or with other suitable means for enabling the pressure difference created to be ascertained or utilized for flow measurement purposes.

One or both of the pressure tappings may be formed in the wall of the element 2 instead of in the wall of the conduit. Figures 1 and 2 show one embodiment of the invention in which several vertically spaced tappings 8 are connected with openings in the wall of the conduit while the other preferably vertically spaced tappings 9 are formed in the wall of the streamlined or tapered element 2, and extend from the top to the bottom of the conduit. As, in this instance, a constricted passage is formed on both sides of the element, two vertically spaced sets of pressure openings 9 are employed. The float well 11 is formed partly within the element 2.

Figure 3 shows an embodiment wherein both of the float wells 10 and 11 are formed partly in the element 2 and wherein the pressure tapping 8 extends from the forward or upstream end of the element to the float well 10 and is provided at its inlet end with a protecting unit 14 which has inlet openings at the sides thereof and serves to prevent the tapping from becoming choked with solids or sludge and to protect the same against the impact velocity. The pressure openings 9 may consist of several vertically spaced tappings on either side of the element 2 at the narrowest portion of the stream.

It will be apparent from the above that no special pipe or conduit sections are required but that constricting members formed according to the invention can be inserted in any flow conduit.

While several embodiments of the invention have been shown and described it will be apparent that many changes might be made and it is not intended to be limited to the forms shown or otherwise than by the terms of the appended claims.

What is claimed is:

1. In a flowmeter, a conduit of substantially uniform interior cross-section, and a member fixed in said conduit and extending diametrically across the conduit and secured at its ends to the conduit to provide constricted flow passages on opposite sides of the member, said member having a pair of spaced openings therein communicating with the conduit and means for measuring the heads in said openings.

2. In a flowmeter, a conduit of substantially uniform interior cross-section, and a member fixed in said conduit and extending diametrically across the conduit to provide constricted flow passages on opposite sides of the member, said member having a float well formed therein communicating with said conduit, and a float in said well.

3. In a flowmeter, a conduit of substantially uniform interior cross-section, and a member fixed in said conduit and extending diametrically across the conduit to provide constricted flow passages on opposite sides of the member, said member having two float wells formed therein, one communicating with the conduit upstream of the member and the other communicating with the conduit opposite the member.

4. In a flowmeter, a conduit of substantially uniform interior cross-section, a member fixed in said conduit and extending diametrically thereacross, at least one end of said member being in engagement with the conduit side wall, said member having a pair of openings therein spaced in the direction of flow and communicating with the conduit, and means partly within said member for measuring the heads in said openings.

5. In a flowmeter, a conduit of substantially uniform interior cross-section, a member fixed in said conduit and extending diametrically thereacross, said member having an opening therein and said conduit having an opening therein, means for measuring the head in said first named opening and arranged partly within said member, and means for measuring the head in said last named opening.

BURTON DUNGLINSON.